US012560220B2

(12) United States Patent
Schacht et al.

(10) Patent No.: US 12,560,220 B2
(45) Date of Patent: Feb. 24, 2026

(54) SYSTEMS AND METHOD FOR AN ELECTRIC POWERTRAIN

(71) Applicant: Dana Belgium N.V., Flanders (BE)

(72) Inventors: Filip D. Schacht, Meulebeke (BE); Kurt Cattoor, Koolkerke (BE); Filip Van Raepenbusch, Bruges (BE)

(73) Assignee: DANA BELGIUM, Bruges (BE)

( * ) Notice: Subject to any disclaimer, the term of this patent is extended or adjusted under 35 U.S.C. 154(b) by 0 days.

(21) Appl. No.: 18/629,784

(22) Filed: Apr. 8, 2024

(65) Prior Publication Data

US 2024/0418242 A1     Dec. 19, 2024

Related U.S. Application Data

(60) Provisional application No. 63/508,770, filed on Jun. 16, 2023.

(51) Int. Cl.
 *F16H 3/00*          (2006.01)
 *B60K 1/02*          (2006.01)
(52) U.S. Cl.
 CPC .............. *F16H 3/006* (2013.01); *B60K 1/02* (2013.01); *F16H 2003/008* (2013.01); *F16H 2200/0021* (2013.01)
(58) Field of Classification Search
 CPC .............. F16H 3/006; F16H 2003/008; F16H 2200/0021; F16H 1/22; F16H 2003/0818; F16H 2003/0931; F16H 2200/0043; F16H 3/093; B60K 1/02
 See application file for complete search history.

(56) References Cited

U.S. PATENT DOCUMENTS

| | | | | |
|---|---|---|---|---|
| 3,802,293 | A * | 4/1974 | Winckler ................ | F16H 3/097 |
| | | | | 74/331 |
| 7,677,135 | B2 * | 3/2010 | Himmelmann ........ | B60K 6/387 |
| | | | | 477/6 |
| 7,798,931 | B2 | 9/2010 | Earhart | |
| 2020/0391582 | A1 * | 12/2020 | Serrao .................... | B60K 25/06 |

FOREIGN PATENT DOCUMENTS

| | | | | |
|---|---|---|---|---|
| CN | 218876881 U | 4/2023 | | |
| DE | 102011084623 A1 | 4/2013 | | |
| DE | 102016221872 A1 | 5/2018 | | |
| DE | 102018210897 A1 * | 1/2020 | .......... | B60K 17/356 |
| WO | 2010089841 A1 | 8/2010 | | |
| WO | 2020078596 A1 | 4/2020 | | |

OTHER PUBLICATIONS

English Translation of DE-102018210897-A1 (Year: 2020).*

* cited by examiner

*Primary Examiner* — Victor L Macarthur
(74) *Attorney, Agent, or Firm* — McCoy Russell LLP

(57) ABSTRACT

Systems and a method are provided for a transmission system. In one example, a multi-speed transmission includes an input shaft comprising an input gear driven by two electric motors, a first gear meshing with a first clutch and a second clutch, and a second gear meshing with a third clutch and a fourth clutch, an idler shaft comprising an idler gear and an idler shaft gear, a first countershaft that is selectively engaged to the first clutch or to the third clutch and is meshed with the idler gear via a third gear, a second countershaft that is selectively engaged to the second clutch or to the fourth clutch and is meshed with the idler gear via a fourth gear; and an output gear meshed with the idler shaft gear and configured to rotate an output shaft.

18 Claims, 4 Drawing Sheets

SYSTEMS AND METHOD FOR AN ELECTRIC POWERTRAIN

CROSS REFERENCE TO RELATED APPLICATION

The present application claims priority to U.S. Provisional Application No. 63/508,770, entitled "SYSTEMS AND METHOD FOR AN ELECTRIC POWERTRAIN", and filed on Jun. 16, 2023. The entire contents of the above-listed application are hereby incorporated by reference for all purposes.

TECHNICAL FIELD

The present description relates generally to a transmission of an electric powertrain a vehicle.

BACKGROUND AND SUMMARY

As the proliferation of vehicle electrification continues, changes to vehicle components are demanded to accommodate new vehicle architectures. For example, transmissions may need multiple gear trains to accommodate torque transfer from one or more electric motors. Packaging of a multi-gear train transmission may present certain challenges as packaging space available in vehicles continues to be reduced.

Thus, a demand for a transmission with multiple gear trains and a reduced packaging size is desired. In one example, the issues described above may be addressed by a multi-speed transmission including an input shaft comprising an input gear driven by two electric motors, a first gear meshing with a first clutch and a second clutch, and a second gear meshing with a third clutch and a fourth clutch. The multi-speed transmission further includes an idler shaft comprising an idler gear and an idler shaft gear, a first countershaft that is selectively engaged to the first clutch or to the third clutch and is meshed with the idler gear via a third gear, a second countershaft that is selectively engaged to the second clutch or to the fourth clutch and is meshed with the idler gear via a fourth gear, and an output shaft meshing with the idler shaft gear via an output gear.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

The above, as well as other advantages of the present disclosure, will become readily apparent to those skilled in the art from the following detailed description when considered in light of the accompanying drawings in which.

DETAILED DESCRIPTION

Figure 1:
FIG. 1 is a schematic depiction of an example vehicle, according to an embodiment of the present disclosure.
Figure 2:
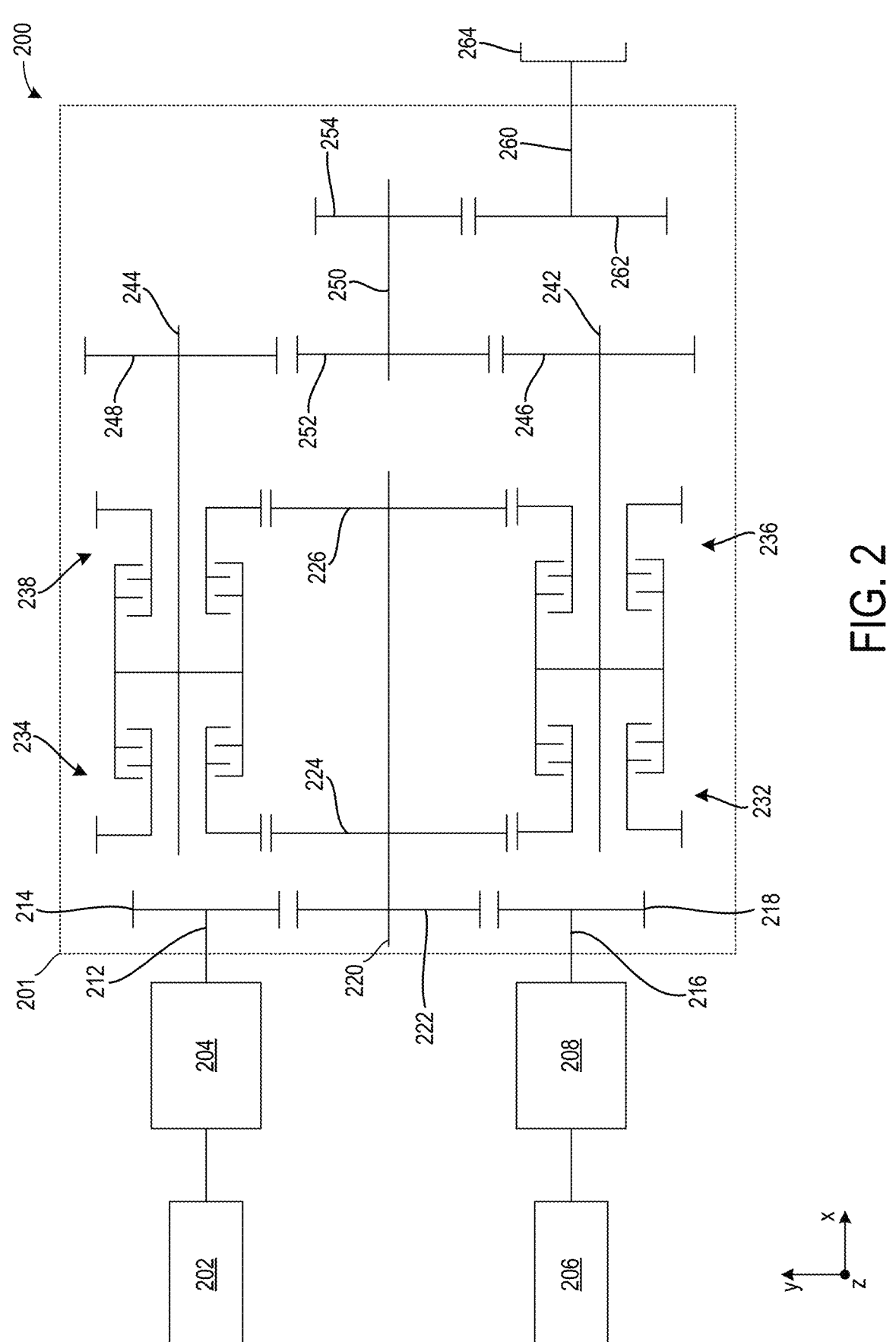
FIG. 2 is an embodiment of a transmission of the vehicle, according to an embodiment of the present disclosure.
Figure 3:
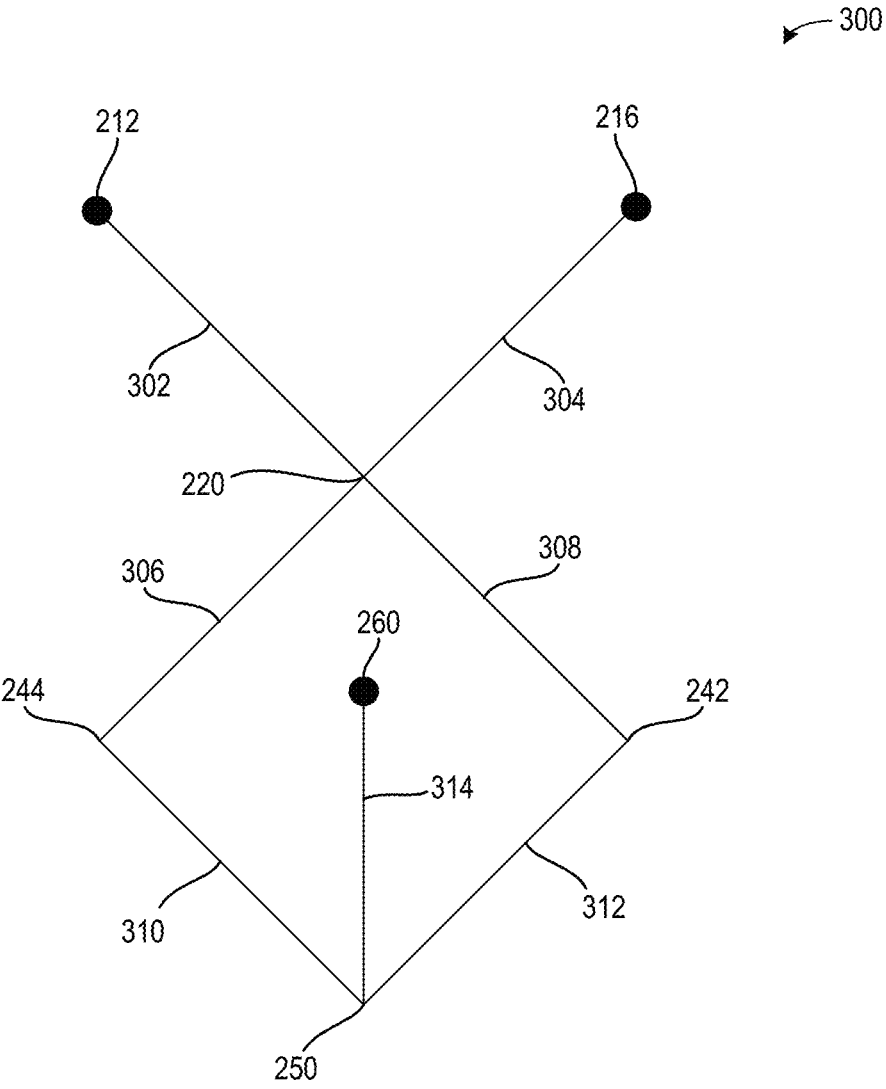
FIG. 3 is an embodiment of a layout of the transmission.
Figure 3:
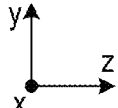
Figure 4:
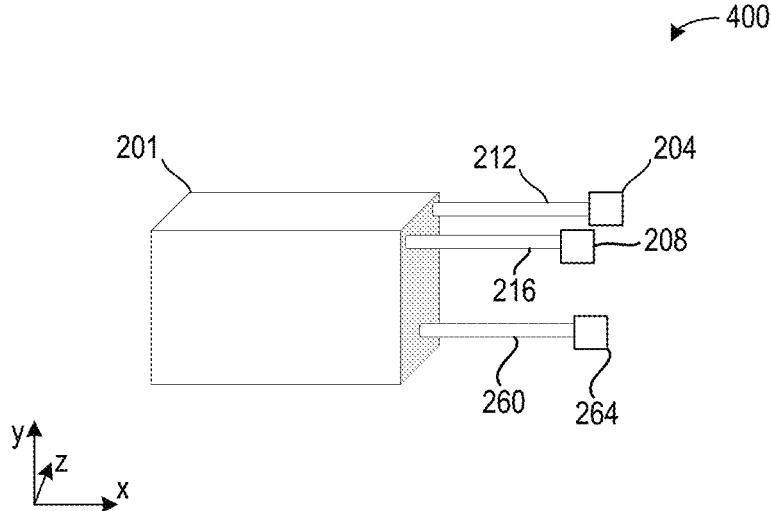
FIG. 4 is a perspective view of the transmission.

The following description relates to a transmission. In one example, the transmission is a multi-speed transmission, as shown in FIG. 1. FIG. 2 illustrates an embodiment of a transmission of the vehicle. FIG. 3 illustrates an embodiment of a layout of the transmission. FIG. 4 is a perspective view of the transmission.

FIGS. 1-4 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

In one example, the disclosure provides support for a transmission coupled to at least one electric motor. In one example, two electric motors are configured to drive a counter shaft transmission with a double drum assembly. The transmission may be used in a vehicle. The vehicle may be a heavy-duty vehicle, a light-duty vehicle, an off-highway vehicle, or other vehicle. In some examples, it may be desired to execute a relatively high torque multiplication in first gear, such as 1:25. An input gear of the transmission may be configured to reduce the speed provided by the electric motors, which may decrease a speed differential across the clutches of the transmission. The input ratio and the output ratio of the transmission may limit a demanded reduction between the input shaft and the two clutch shafts comprising a total of four clutches, two clutches on each of the clutch shafts. As such, a size of the gears included in the transmission may be reduced, which may decrease a packaging size of the transmission. The double clutch arrangement may further decrease a number of gear engagements and increase efficiency of the system. This may increase a longevity of the transmission and decrease service requests. Additionally or alternatively, a centerline of the input and output shafts may be substantially parallel to one another. In one example, substantially parallel may be defined as two lines with primary vectors extending in a single direction.

The transmission may be a multi-speed transmission comprising a plurality of shafts, gears, clutches, and bearings. The configuration of the components of the transmission may allow four distinct speeds to be achieved.

Turning now to FIG. 1, a vehicle 100 is shown comprising a powertrain 101 and a drivetrain 103. The powertrain comprises a prime mover 106 and a transmission 108. The prime mover 106 may be an internal combustion engine or an electric motor, for example, and is operated to provide rotary power to the transmission 108. The transmission 108 may be any type of transmission, such as a manual transmission, an automatic transmission, or a continuously variable transmission. The transmission 108 receives the rotary power produced by the prime mover 106 as an input and outputs rotary power to the drivetrain 103 in accordance with a selected gear or setting.

In one example, the prime mover 106 is a first prime mover 106 and the vehicle 100 may further include a second prime mover 107. The first prime mover 106 may be different than the second prime mover 107. For example, the first prime mover 106 may be an electric machine and the second prime mover 107 may be an internal combustion engine. Additionally or alternatively, the first prime mover 106 and the second prime mover 107 may both be an electric motor or an internal combustion engine, however, a size and/or a fuel source thereof may be different between the first and second prime movers. In some examples, additionally or alternatively, if one of the first prime mover 106 and the second prime mover 107 is an engine, the engine may be configured to combust multiple fuels including varying amounts of carbon and carbon-free fuels.

Each of the first prime mover 106 and the second prime mover 107 may be coupled to an energy storage device. The energy storage device may be a battery, a fuel tank, or other similar device. A charge of fuel volume of the energy storage device may be monitored via a sensor or estimated based on vehicle operating conditions. In one example, one or more of the first prime mover 106 and the second prime mover 107 may be configured to replenish a charge of the energy storage device during a generator operation.

In one example, the first prime mover 106 and the second prime mover 107 are electric machines coupled to an energy storage system including a plurality of battery cells. Inverters may be configured to control electrical power provided to corresponding electric machines.

The vehicle 100 may be a commercial vehicle, light, medium, or heavy duty vehicle, a passenger vehicle, an off-highway vehicle, a locomotive, and a sport utility vehicle. Additionally or alternatively, the vehicle 100 and/or one or more of its components may be in industrial, locomotive, military, agricultural, and aerospace applications.

In some examples, such as shown in FIG. 1, the drivetrain 103 includes a first axle assembly 102 and a second axle assembly 112. The first axle assembly 102 may be configured to drive a first set of wheels 104, and the second axle assembly 112 may be configured to drive a second set of wheels 114. In one example, the first axle assembly 102 is arranged near a front of the vehicle 100 and thereby comprises a front axle, and the second axle assembly 112 is arranged near a rear of the vehicle 100 and thereby comprises a rear axle. The drivetrain 103 is shown in a four-wheel drive configuration, although other configurations are possible. For example, the drivetrain 103 may include a front-wheel drive, a rear-wheel drive, or an all-wheel drive configuration. Further, the drivetrain 103 may include one or more tandem axle assemblies. As such, the drivetrain 103 may have other configurations without departing from the scope of this disclosure, and the configuration shown in FIG. 1 is provided for illustration, not limitation. Further, the vehicle 100 may include additional wheels that are not coupled to the drivetrain 103.

In some four-wheel drive configurations, such as shown in FIG. 1, the drivetrain 103 includes a transfer case 110 configured to receive rotary power output by the transmission 108. A first driveshaft 113 is drivingly coupled to a first output 111 of the transfer case 110, while a second driveshaft 122 is drivingly coupled to a second output 121 of the transfer case 110. The first driveshaft 113 (e.g., a front driveshaft) transmits rotary power from the transfer case 110 to a first differential 116 of the first axle assembly 102 to drive the first set of wheels 104, while the second driveshaft 122 (e.g., a rear driveshaft) transmits the rotary power from the transfer case 110 to a second differential 126 of the second axle assembly 112 to drive the second set of wheels 114. For example, the first differential 116 is drivingly coupled to a first set of axle shafts 118 coupled to the first set of wheels 104, and the second differential 126 is drivingly coupled to a second set of axle shafts 128 coupled to the second set of wheels 114. It may be appreciated that each of the first set of axle shafts 118 and the second set of axle shafts 128 may be positioned in a housing.

In some examples, additionally or alternatively, the vehicle 100 may be a hybrid vehicle including both the engine and the electric machine each configured to supply power to one or more of the first axle assembly 102 and the second axle assembly 112. For example, one or both of the first axle assembly 102 and the second axle assembly 112 may be driven via power originating from the engine in a first operating mode where the electric machine is not operated to provide power (e.g., an engine-only mode), via power originating from the electric machine in a second operating mode where the engine is not operated to provide power (e.g., an electric-only mode), and via power originating from both the engine and the electric machine in a third operating mode (e.g., an electric assist mode). As another example, one or both of the first axle assembly 102 and the second axle assembly 112 may be an electric axle assembly configured to be driven by an integrated electric machine.

The vehicle 100 may further include a control system 184. Control system 184 is shown comprising a controller 182 receiving information from a plurality of sensors 186 and sending control signals to a plurality of actuators 188. The controller 182 may receive input data from the various sensors, process the input data, and trigger the actuators in response to the processed input data based on instruction or code programmed therein corresponding to one or more routines. The plurality of sensors 186 may include speed sensors, temperature sensors, humidity sensors, location sensors, accelerometers, and the like. The plurality of actuators 188 may be actuators of one more valves, motors, and other devices.

Turning now to FIG. 2, it shows a transmission assembly 200. The transmission assembly 200 may be included in vehicle 100 of FIG. 1. In one example, the transmission assembly 200 is a non-limiting example of the transmission 108 of FIG. 1. The transmission assembly 200 may be a multi-speed transmission. In one example, the transmission assembly 200 is a two-speed transmission.

An axis system is shown comprising an x-axis, a y-axis normal to the x-axis, and a z-axis normal to each of the x- and y-axes. In one example, the x-axis is parallel to a horizontal direction, the y-axis is parallel to a vertical axis, and the z-axis is parallel to a transverse direction.

A first inverter 202 is electrically coupled to a first electric motor 204. A second inverter 206 is electrically coupled to a second electric motor 208. The first inverter 202 and the second inverter 206 may be configured to transfer power from an energy storage device to the first electric motor 204 and the second electric motor 208, respectively. In one example, the first electric motor 204 is a non-limiting example of the first prime mover 106 of FIG. 1 and the second electric motor 208 is a non-limiting example of the second prime mover 107 of FIG. 1.

The first electric motor 204 may include a first output shaft 212 on which a first electric motor output gear 214 is arranged. The second electric motor 208 may include a second output shaft 216 on which a second electric motor output gear 218 is arranged. In one embodiment, the first electric motor 204 and the second electric motor 208 may be sized identically. In some examples, additionally or alternatively, the first electric motor 204 may be a different size than the second electric motor 208. In one example, the first electric motor output gear 214 is shaped and sized identically to the second electric motor output gear 218. In some examples, additionally or alternatively, the first electric motor output gear 214 is shaped and/or sized differently than the second electric motor output gear 218.

An input gear 222 may be arranged on an input shaft 220. The input gear 222 may be in meshed engagement with each of the first electric motor output gear 214 and the second electric motor output gear 218. In one example, each of the first electric motor output gear 214, the second electric motor output gear 218, and the input gear 222 are arranged within a transmission casing 201. A boundary of the transmission casing 201 is illustrated via a dashed box. As such, each of the first output shaft 212 and the second output shaft 216 may extend in a direction parallel to the x-axis and through a surface of the transmission casing 201 into an interior volume thereof. In this way, the first electric motor 204 and the second electric motor 208 are arranged outside of the transmission casing 201.

The input gear 222 may rotate the input shaft 220 when at least one or more of the first electric motor output gear 214 and the second electric motor output gear 218 rotates. A first gear 224 may be arranged on the input shaft 220. A second gear 226 may be arranged on the input shaft 220. Each of the first gear 224 and the second gear 226 may rotate as the input shaft 220 rotates. In one example, the first gear 224 is arranged closer to the input gear 222 on the input shaft 220 than the second gear 226. The first gear 224 and the second gear 226 may be identical in shape and size. Additionally or alternatively, the first gear 224 and the second gear 226 may be different in size.

The first gear 224 may be in meshed engagement with a gear of a first clutch 232 and a second clutch 234. The second gear 226 may be in meshed engagement with a gear of a third clutch 236 and a gear of a fourth clutch 238. The first clutch 232 and the third clutch 236 may be arranged on a first countershaft 242. The second clutch 234 and the fourth clutch 238 may be arranged on a second countershaft 244.

In one example, each of the first clutch 232, the second clutch 234, the third clutch 236, and the fourth clutch 238 is a wet clutch comprising a gear, a hub, a plurality of friction plates coupled to the hub, a plurality of separator plates selectively couplable to the plurality of friction plates via actuation of a piston based on a force of hydraulic fluid and a spring force. Each of the first clutch 232, the second clutch 234, the third clutch 236, and the fourth clutch 238 may be configured to transfer or suspend power transfer from the first gear 224 and the second gear 226 to the first countershaft 242 and the second countershaft 244, respectively.

More specifically, if the first clutch 232 is engaged, then the first gear 224 may transfer power to the first countershaft 242. If the second clutch 234 is engaged, then the first gear 224 may transfer power to the second countershaft 244. If the third clutch 236 is engaged, then the second gear 226 may transfer power to the first countershaft 242. If the fourth clutch 238 is engaged, then the second gear 226 may transfer power to the second countershaft 244.

If the first clutch 232 is disengaged, then torque transfer from the first gear 224 to the first countershaft 242 is suspended (e.g., stopped). If the second clutch 234 is disengaged, then torque transfer from the first gear 224 to the second countershaft 244 is suspended. If the third clutch 236 is disengaged, then torque transfer from the second gear 226 to the first countershaft 242 is suspended. If the fourth clutch 238 is disengaged, then torque transfer from the second gear 226 to the second countershaft 244 is suspended. During some operating conditions, only one of the first through fourth clutches may be engaged and the remaining three may be disengaged.

A third gear 246 may be arranged on the first countershaft 242. A fourth gear 248 may be arranged on the second countershaft 244. The third gear 246 may be arranged near an end of the first countershaft 242 closer to the third clutch 236 than the first clutch 232. The fourth gear 248 may be arranged near an end of the second countershaft 244 closer to the fourth clutch 238 than the second clutch 234. The third gear 246 may be physically coupled to the first countershaft 242 and configured to rotate therewith. The fourth gear 248 may be physically coupled to the second countershaft 244 and configured to rotate therewith.

An idler gear 252 may be arranged on an idler shaft 250. The idler gear 252 may be in meshed engagement with the third gear 246 and the fourth gear 248. The idler gear 252 may be coupled to and configured to rotate with the idler shaft 250.

An idler shaft gear 254 may be coupled to and rotated by the idler shaft 250. In one example, the idler shaft gear 254 may be arranged at an end of the idler shaft 250 opposite an end at which the idler gear 252 is arranged. The idler shaft gear 254 may be in meshed engagement with an output gear 262 arranged on an output shaft 260. In one example, the output shaft 260 is a transmission output shaft. The output gear 262 may be coupled to and rotated by the output shaft 260.

An output member 264 may be arranged on the output shaft 260. The output member 264 may be arranged at an end of the output shaft 260 opposite to an end of the output shaft 260 at which the output gear 262 is arranged. In one example, the output member 264 is a second output gear coupled to a differential. In other examples, additionally or alternatively, the output member 264 is a flange coupled to a wheel. The output gear 262 is arranged within the transmission casing 201, wherein the output shaft 260 extends from the output gear 262 to the output member 264 arranged outside of the transmission casing 201.

Turning now to FIG. 3, it shows an example layout 300 of the transmission 200. As illustrated in the layout 300, the first input shaft 212, the second input shaft 216, and the output shaft 260 are parallel to the x-axis. In one example, additionally or alternatively, the first input shaft 212, the second input shaft 216, and the output shaft 260 may include a vector that extends parallel to the x-axis.

The example layout 300 illustrates gear interactions via lines and shafts at intersections between the lines. Angles of the lines may be representative of the angles of the gears in the arrangement of the transmission 200 on a vehicle. Line 302 illustrates an interaction between the first electric motor output gear 214 and the input gear 222. Line 304 illustrates an interaction between the second electric motor output gear 218 and the input gear 222. Line 306 illustrates an interaction between the first gear 224, the first clutch 232, and the second clutch 234. Line 308 illustrates an interaction between the second gear 226, the third clutch 236, and the fourth clutch 238. Line 310 illustrates an interaction between the fourth gear 248 and the idler gear 252. Line 312 illustrates an interaction between the third gear 246 and the idler gear 252. Line 314 illustrates an interaction between the idler shaft gear 254 and the output gear 262.

Turning now to FIG. 4, it shows a perspective view 400 of the transmission casing 201. As illustrated, the first input shaft 212, the second input shaft 216, and the output shaft 260 extend through a same side of the transmission casing 201. The first input shaft 212, the second input shaft 216, and the output shaft 260 are parallel to one another along the x-axis. In some examples, additionally or alternatively, one or more of the first input shaft 212, the second input shaft 216, and the output shaft 260 may extend through an opposite side of the transmission casing 201 while still being parallel with the other shafts. In this way, the transmission casing and the transmission components housed therein may be used in a variety of vehicles drivetrain configurations.

The disclosure also provides support for a multi-speed transmission, comprising: an input shaft comprising an input gear driven by two electric motors, a first gear meshed with a first clutch and a second clutch, and a second gear meshed with a third clutch and a fourth clutch, an idler shaft comprising an idler gear and an idler shaft gear, a first countershaft that is selectively engaged to the first clutch or to the third clutch and is meshed with the idler gear via a third gear, a second countershaft that is selectively engaged to the second clutch or to the fourth clutch and is meshed with the idler gear via a fourth gear, and an output gear meshed with the idler shaft gear and configured to rotate an output shaft. In a first example of the system, the output shaft comprises a primary vector that is parallel to primary vectors of shafts extending from the two electric motors to the input shaft. In a second example of the system, optionally including the first example, the input shaft is completely arranged within a transmission casing. In a third example of the system, optionally including one or both of the first and second examples, the output shaft extends from the output gear within the transmission casing to an output member arranged outside of the transmission casing. In a fourth example of the system, optionally including one or more or each of the first through third examples, the first clutch, the second clutch, the third clutch, and the fourth clutch are wet clutches. In a fifth example of the system, optionally including one or more or each of the first through fourth examples, the transmission is configured to generate four distinct speeds.

The disclosure also provides support for a system, comprising: a first electric motor with a first output shaft extending into a transmission casing in a direction parallel to an axis, a second electric motor with a second output shaft extending into the transmission casing in the direction parallel to the axis, and an output shaft extending out of the transmission casing in the direction parallel to the axis. In a first example of the system, the first output shaft comprises a first electric motor output gear and the second output shaft comprises a second electric motor output gear, wherein the first electric motor output gear and the second electric motor output gear are arranged within the transmission casing. In a second example of the system, optionally including the first example, the first electric motor output gear and the second electric motor output gear are in meshed engagement with an input gear arranged on an input shaft in the transmission casing. In a third example of the system, optionally including one or both of the first and second examples, the system further comprises: a first gear and a second gear arranged on the input shaft, the first gear and the second gear in meshed engagement with clutch gears of four clutches. In a fourth example of the system, optionally including one or more or each of the first through third examples, an idler shaft comprising an idler gear and an idler shaft gear is arranged within the transmission casing. In a fifth example of the system, optionally including one or more or each of the first through fourth examples, the idler shaft gear is in meshed engagement with an output gear arranged on a portion of the output shaft within the transmission casing. In a sixth example of the system, optionally including one or more or each of the first through fifth examples, the first output shaft and the second output shaft extend through a same side of the transmission casing. In a seventh example of the system, optionally including one or more or each of the first through sixth examples, one or more of the first output shaft, the second output shaft, and the output shaft extend through an opposite side of the transmission casing relative to at least one other shaft. In an eighth example of the system, optionally including one or more or each of the first through seventh examples, the transmission casing houses a multi-speed transmission.

The disclosure also provides support for a system, comprising: an input shaft comprising an input gear driven by output gears of two electric motors, a first gear on the input shaft meshed with a first clutch and a second clutch, and a second gear on the input shaft meshed with a third clutch and a fourth clutch, an idler shaft comprising an idler gear and an idler shaft gear, a first countershaft that is selectively engaged to the first clutch or to the third clutch and is meshed with the idler gear via a third gear, a second countershaft that is selectively engaged to the second clutch or to the fourth clutch and is meshed with the idler gear via a fourth gear, and an output gear on an output shaft, the output gear meshed with the idler shaft gear, wherein the output shaft is parallel to output shafts of the two electric motors. In a first example of the system, only the output shafts of the two electric motors and the output shaft extend outside of a transmission casing. In a second example of the system, optionally including the first example, the output shaft and the output shafts of the two electric motors extend through a single side of a transmission casing. In a third example of the system, optionally including one or both of the first and second examples, only one of the first clutch or the second clutch is engaged during a condition. In a fourth example of the system, optionally including one or more or each of the first through third examples, only one of the third clutch or the fourth clutch is engaged during a condition.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first"

element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A multi-speed transmission, comprising:
an input shaft comprising an input gear driven by two electric motors, a first gear meshed with a first clutch and a second clutch, and a second gear meshed with a third clutch and a fourth clutch;
an idler shaft comprising an idler gear and an idler shaft gear, wherein the idler shaft is collinear with the input shaft;
a first countershaft that is selectively engaged to the first clutch or to the third clutch and is directly coupled with the idler gear via a third gear, wherein the first countershaft is parallel with the idler shaft;
a second countershaft that is selectively engaged to the second clutch or to the fourth clutch and is directly coupled with the idler gear via a fourth gear, wherein the second countershaft is parallel with the idler shaft; and
an output gear meshed with the idler shaft gear and configured to rotate a transmission output shaft, wherein the transmission output shaft is parallel with the input shaft but offset vertically below the input shaft and further is offset vertically below the idler shaft, and extends from the output gear within a transmission casing to an output member arranged outside of the transmission casing, wherein a first motor of the two electric motors is positioned vertically above a second motor of the two electric motors.

2. The multi-speed transmission of claim 1, wherein the output shaft comprises a vector that is parallel to vectors of motor output shafts extending from the two electric motors to the input shaft.

3. The multi-speed transmission of claim 1, wherein the input shaft is completely arranged within the transmission casing.

4. The multi-speed transmission of claim 1, wherein the first clutch, the second clutch, the third clutch, and the fourth clutch are wet clutches.

5. The multi-speed transmission of claim 1, wherein the transmission is configured to generate four distinct speeds.

6. A system, comprising:
an idler shaft collinear with an input shaft and parallel to a first countershaft and a second countershaft;
a first electric motor with a first output shaft extending into a transmission casing in a direction parallel to the idler shaft;
a second electric motor with a second output shaft extending into the transmission casing in the direction parallel to the idler shaft; and
a transmission output shaft extending out of the transmission casing in the direction parallel to, the idler shaft but offset vertically below the input shaft and the idler shaft, wherein the first electric motor is positioned vertically above the second electric motor.

7. The system of claim 6, wherein the first output shaft comprises a first electric motor output gear and the second output shaft comprises a second electric motor output gear, wherein the first electric motor output gear and the second electric motor output gear are arranged within the transmission casing.

8. The system of claim 7, wherein the first electric motor output gear and the second electric motor output gear are in meshed engagement with an input gear arranged on the input shaft in the transmission casing.

9. The system of claim 8, further comprising a first gear and a second gear arranged on the input shaft, the first gear and the second gear in meshed engagement with clutch gears of four clutches.

10. The system of claim 6, wherein the idler shaft comprising an idler gear and an idler shaft gear is arranged within the transmission casing.

11. The system of claim 10, wherein the idler shaft gear is in meshed engagement with an output gear arranged on a portion of the output shaft within the transmission casing.

12. The system of claim 6, wherein an input gear is driven via the first output shaft and the second output shaft, the input gear is arranged on the input shaft within the transmission casing including a first gear coupled to a first clutch and a second clutch and a second gear coupled to a third clutch and a fourth clutch, wherein the first clutch and the third clutch are arranged on the first countershaft and the second clutch and the fourth clutch are arranged on the second countershaft, wherein the idler shaft comprises an idler gear that is driven via either a third gear of the first countershaft or a fourth gear of the second countershaft.

13. The system of claim 6, wherein one or more of the first output shaft, the second output shaft, and the output shaft extend through an opposite side of the transmission casing relative to at least one other shaft.

14. The system of claim 6, wherein the transmission casing houses a multi-speed transmission.

15. A system, comprising:
an input shaft comprising an input gear driven by output gears arranged on output shafts of two electric motors, a first gear on the input shaft meshed with a first clutch and a second clutch, and a second gear on the input shaft meshed with a third clutch and a fourth clutch, wherein the output shafts of the two electric motors extend through a side of a transmission casing;
an idler shaft comprising an idler gear and an idler shaft gear, wherein the idler shaft is collinear with the input shaft;
a first countershaft that is selectively engaged to the first clutch or to the third clutch and is directly coupled with the idler gear via a third gear, wherein the first countershaft is parallel with the idler shaft;
a second countershaft that is selectively engaged to the second clutch or to the fourth clutch and is directly coupled with the idler gear via a fourth gear, wherein the second countershaft is parallel with the idler shaft; and
an output gear on a transmission output shaft, the output gear meshed with the idler shaft gear;
wherein the transmission output shaft is parallel to the output shafts of the two electric motors, wherein the transmission output shaft is parallel with the input shaft but offset vertically below the input shaft and further is offset vertically below the idler shaft, and extends through the side of the transmission casing to an output member arranged outside the transmission casing, and wherein a first motor of the two electric motors is positioned vertically above a second motor of the two electric motors.

16. The system of claim 15, wherein only the output shafts of the two electric motors and the output shaft extend outside of the transmission casing.

17. The system of claim 15, wherein only one of the first clutch or the second clutch is engaged during a condition.

18. The system of claim 15, wherein only one of the third clutch or the fourth clutch is engaged during a condition.

* * * * *